United States Patent
Asano

(10) Patent No.: US 11,567,589 B2
(45) Date of Patent: Jan. 31, 2023

(54) INFORMATION PROCESSING DEVICE, INFORMATION PROCESSING METHOD, PROGRAM, DISPLAY SYSTEM, DISPLAY METHOD, AND ELECTRONIC WRITING INSTRUMENT

(71) Applicant: Sharp NEC Display Solutions, Ltd., Tokyo (JP)

(72) Inventor: Takahiro Asano, Tokyo (JP)

(73) Assignee: SHARP NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 17/466,079

(22) Filed: Sep. 3, 2021

(65) Prior Publication Data

US 2021/0397276 A1    Dec. 23, 2021

Related U.S. Application Data

(63) Continuation of application No. PCT/JP2019/009301, filed on Mar. 8, 2019.

(51) Int. Cl.
*G06F 3/0354* (2013.01)
*G06F 3/0346* (2013.01)
(Continued)

(52) U.S. Cl.
CPC ........ *G06F 3/03542* (2013.01); *G06F 3/0346* (2013.01); *G06F 3/0386* (2013.01);
(Continued)

(58) Field of Classification Search
CPC . G06F 3/03542; G06F 3/03545; G06F 3/0386
See application file for complete search history.

(56) References Cited

U.S. PATENT DOCUMENTS

2014/0285524 A1* 9/2014 Koyama ............... G06F 3/0425
                                                    345/650
2017/0185233 A1* 6/2017 Ono ....................... G06F 3/0386
(Continued)

FOREIGN PATENT DOCUMENTS

JP      2009-205425 A    9/2009
JP      2009-244737 A   10/2009
(Continued)

OTHER PUBLICATIONS

International Search Report (ISR) (PCT Form PCT/ISA/210), in PCT/JP2019/009301, dated May 28, 2019.

*Primary Examiner* — Koosha Sharifi-Tafreshi
(74) *Attorney, Agent, or Firm* — McGinn I.P. Law Group, PLLC.

(57) ABSTRACT

An information processing device includes: an acquisition unit and an association unit. The acquisition unit acquires first information, generated by processing a detection result which is output from a first sensor provided outside an electronic writing instrument, which includes a trajectory traced by the electronic writing instrument in writing of an object on a display image and second information, generated by processing a detection result which is output from a second sensor provided in the electronic writing instrument to detect a movement of the electronic writing instrument, which includes a trajectory traced by the electronic writing instrument in writing of the object on the display image. The association unit associates the object with the electronic writing instrument using the first information and the second information.

15 Claims, 8 Drawing Sheets

(51) Int. Cl.
*G06F 3/038* (2013.01)
*G06F 3/042* (2006.01)
*G06F 3/14* (2006.01)

(52) U.S. Cl.
CPC ........ *G06F 3/03545* (2013.01); *G06F 3/0425* (2013.01); *G06F 3/14* (2013.01)

(56) References Cited

U.S. PATENT DOCUMENTS

2018/0074654 A1* 3/2018 Tanaka .................. G06F 3/0425
2018/0217683 A1* 8/2018 Kobayashi .............. G06F 3/042

FOREIGN PATENT DOCUMENTS

| JP | 2012-043227 A | 3/2012 |
| JP | 2016-018455 A | 2/2016 |
| JP | WO 2017/017812 A1 | 2/2017 |
| JP | 2018-132799 A | 8/2018 |
| JP | 2018-156466 A | 10/2018 |

* cited by examiner

FIG. 3
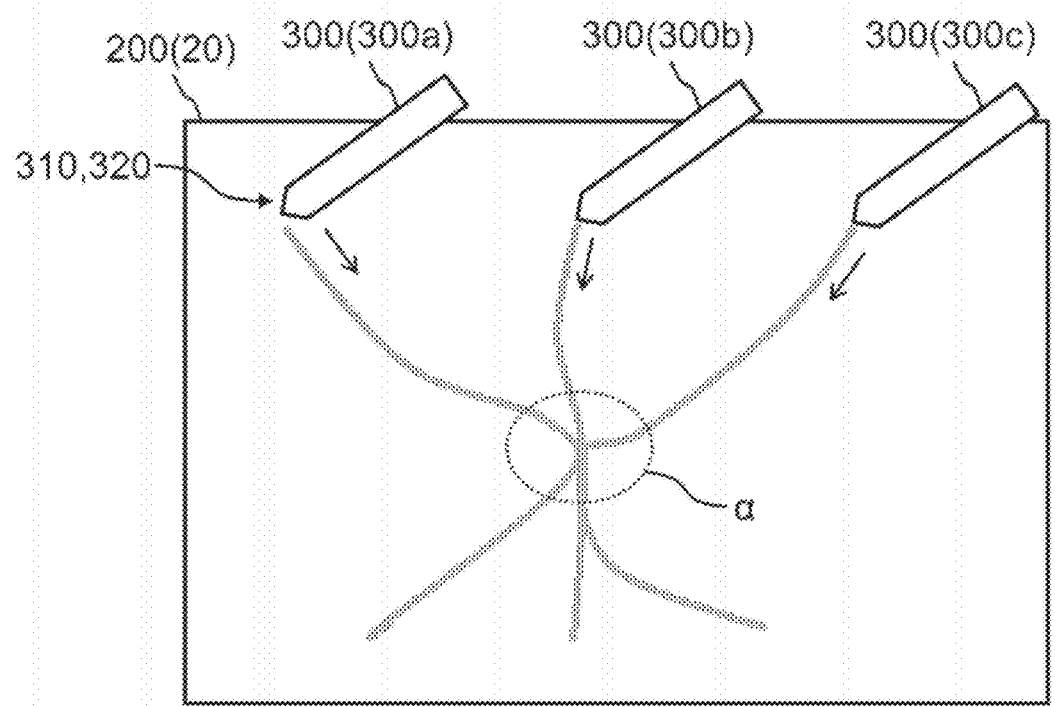
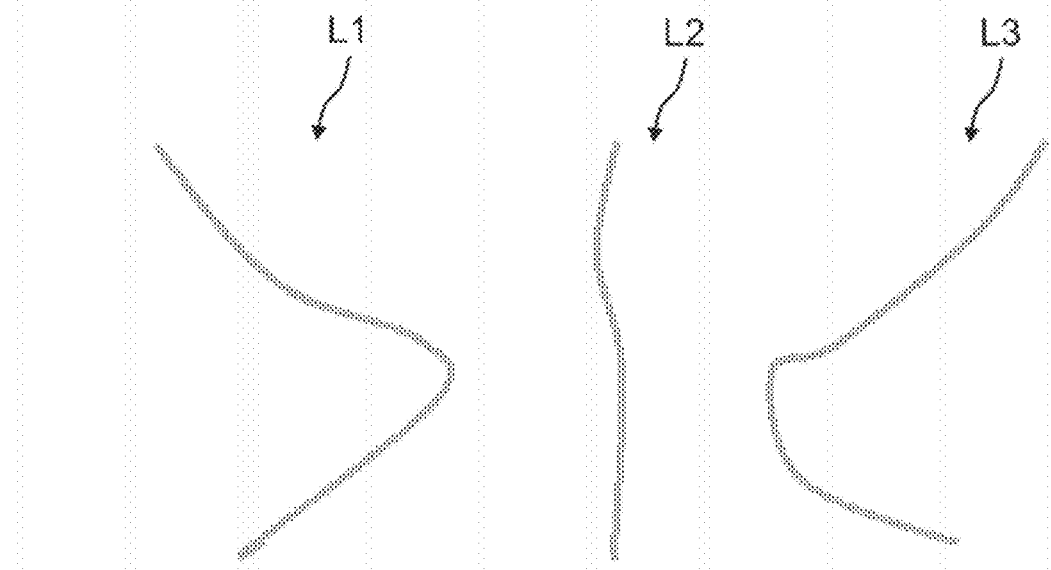

INFORMATION PROCESSING DEVICE, INFORMATION PROCESSING METHOD, PROGRAM, DISPLAY SYSTEM, DISPLAY METHOD, AND ELECTRONIC WRITING INSTRUMENT

TECHNICAL FIELD

The present invention relates to an information processing device, an information processing method, program, a display system, a display method, and an electronic writing instrument.

BACKGROUND ART

In recent years, display systems in which a user can write an object (for example, a character, a figure, or a symbol) on a display image projected on a projector or displayed on a display using an electronic writing instrument have been developed.

Patent Literature 1 discloses an example of a display system. In this display system, an object is written on a display image with an electronic writing instrument. The electronic writing instrument has a light-emitting portion. Light emitted from the light-emitting portion of the electronic writing instrument is captured by a camera. It is possible to obtain a trajectory traced by the electronic writing instrument using this light.

CITATION LIST

Patent Literature

Patent Literature 1

Japanese Unexamined Patent Application, First Publication No. 2018-132799

SUMMARY OF INVENTION

Technical Problem

As disclosed in Patent Literature 1, in a case where an object is written on a display image with an electronic writing instrument, it may be required to specify which object is written with which electronic writing instrument with a high degree of certainty.

An example of an object of the present invention it to specify which object is written with which electronic writing instrument with a high degree of certainty. Other objects of the present invention will be made clearer from the description of the present specification.

Solution to Problem

According to an aspect of the present invention, there is provided an information processing device including:

an acquisition unit that acquires first information, generated by processing a detection result which is output from a first sensor provided outside an electronic writing instrument, which includes a trajectory traced by the electronic writing instrument in writing of an object on a display image and second information, generated by processing a detection result which is output from a second sensor provided in the electronic writing instrument to detect a movement of the electronic writing instrument, which includes a trajectory traced by the electronic writing instrument in writing of the object on the display image; and an association unit that associates the object with the electronic writing instrument using the first information and the second information.

According to another aspect of the present invention, there is provided an information processing method including:

acquiring first information, generated by processing a detection result which is output from a first sensor provided outside an electronic writing instrument, which includes a trajectory traced by the electronic writing instrument in writing of an object on a display image and second information, generated by processing a detection result which is output from a second sensor provided in the electronic writing instrument to detect a movement of the electronic writing instrument, which includes a trajectory traced by the electronic writing instrument in writing of the object on the display image; and associating the object with the electronic writing instrument using the first information and the second information.

According to still another aspect of the present invention, there is provided a program causing a computer to have:

a function of acquiring first information, generated by processing a detection result which is output from a first sensor provided outside an electronic writing instrument, which includes a trajectory traced by the electronic writing instrument in writing of an object on a display image and second information, generated by processing a detection result which is output from a second sensor provided in the electronic writing instrument to detect a movement of the electronic writing instrument, which includes a trajectory traced by the electronic writing instrument in writing of the object on the display image; and a function of associating the object with the electronic writing instrument using the first information and the second information.

According to still another aspect of the present invention, there is provided a display system including:

a display device;

an electronic writing instrument which is used for writing of an object on a display image displayed by the display device; and an information processing device, wherein the information processing device includes an acquisition unit that acquires first information, generated by processing a detection result which is output from a first sensor provided outside the electronic writing instrument, which includes a trajectory traced by the electronic writing instrument in writing of the object on the display image and second information, generated by processing a detection result which is output from a second sensor provided in the electronic writing instrument to detect a movement of the electronic writing instrument, which includes a trajectory traced by the electronic writing instrument in writing of the object on the display image, and an association unit that associates the object with the electronic writing instrument using the first information and the second information.

According to still another aspect of the present invention, there is provided a display method including:

detecting, when an electronic writing instrument writes an object on a display screen, a trajectory of the electronic writing instrument using a sensor provided in the electronic writing instrument; and displaying the object associated with the electronic writing instrument, using information of the trajectory, on the display screen in a mode according to the electronic writing instrument.

According to still another aspect of the present invention, there is provided an electronic writing instrument including:

a light-emitting portion that emits light in writing of an object on a display image; and a sensor that detects a movement of the electronic writing instrument in writing of the object on the display image.

Advantageous Effects of Invention

According to an aspect of the present invention, it is possible to specify which object is written with which electronic writing instrument with a high degree of certainty.

BRIEF DESCRIPTION OF DRAWINGS

The above and other objects, features and advantages will be made clearer from certain preferred embodiments to be described below and the following accompanying drawings.

FIG. 3 is a diagram illustrating an example of an operation of the display system.

DESCRIPTION OF EMBODIMENTS

Figure 1:
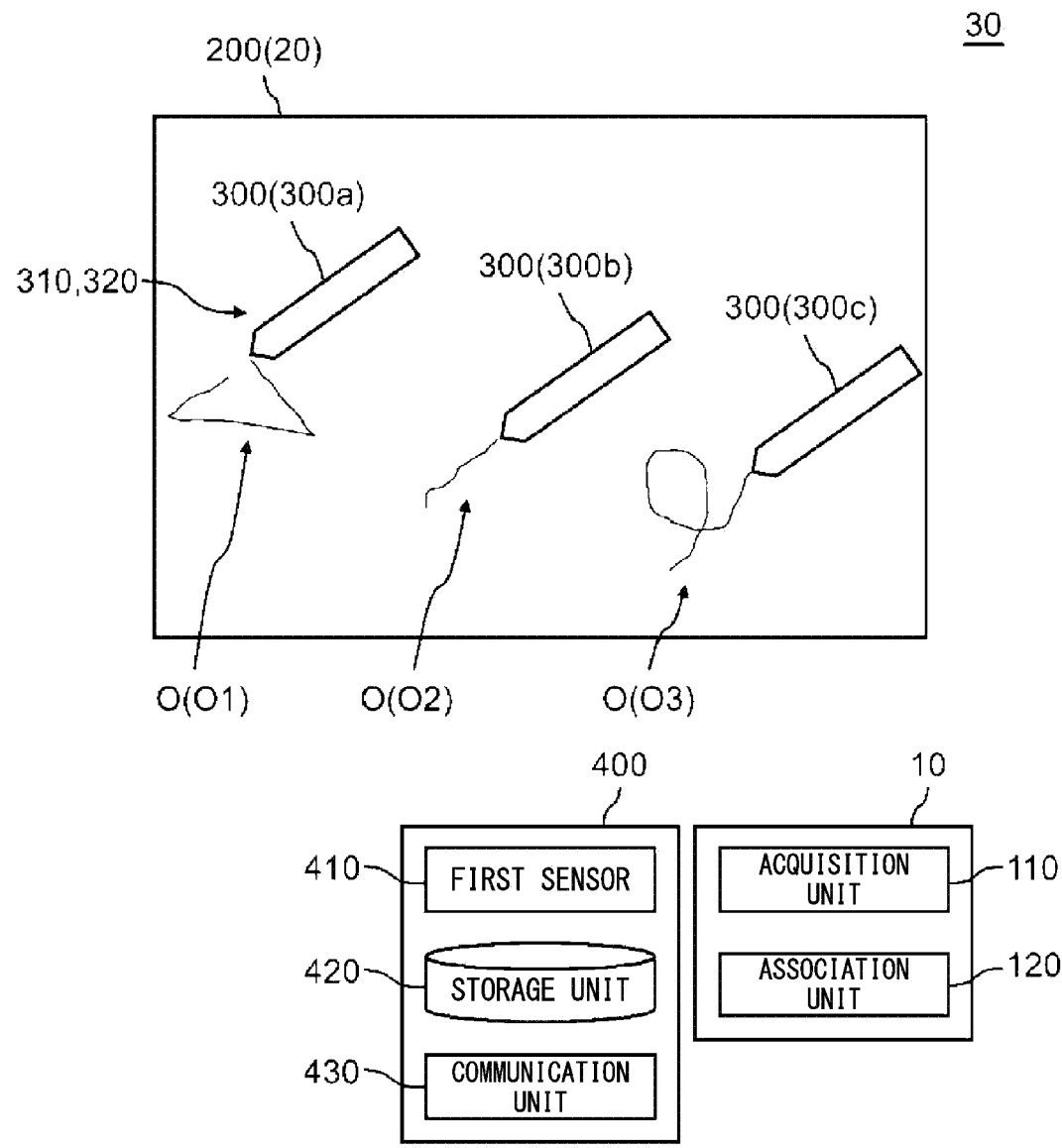
FIG. 1 is a diagram illustrating a display system according to Embodiment 1.

Hereinafter, embodiments of the present invention will be described with reference to the accompanying drawings. In all the drawings, like elements are referenced by like reference numerals and the descriptions thereof will not be repeated.

First Embodiment

Figure 2:
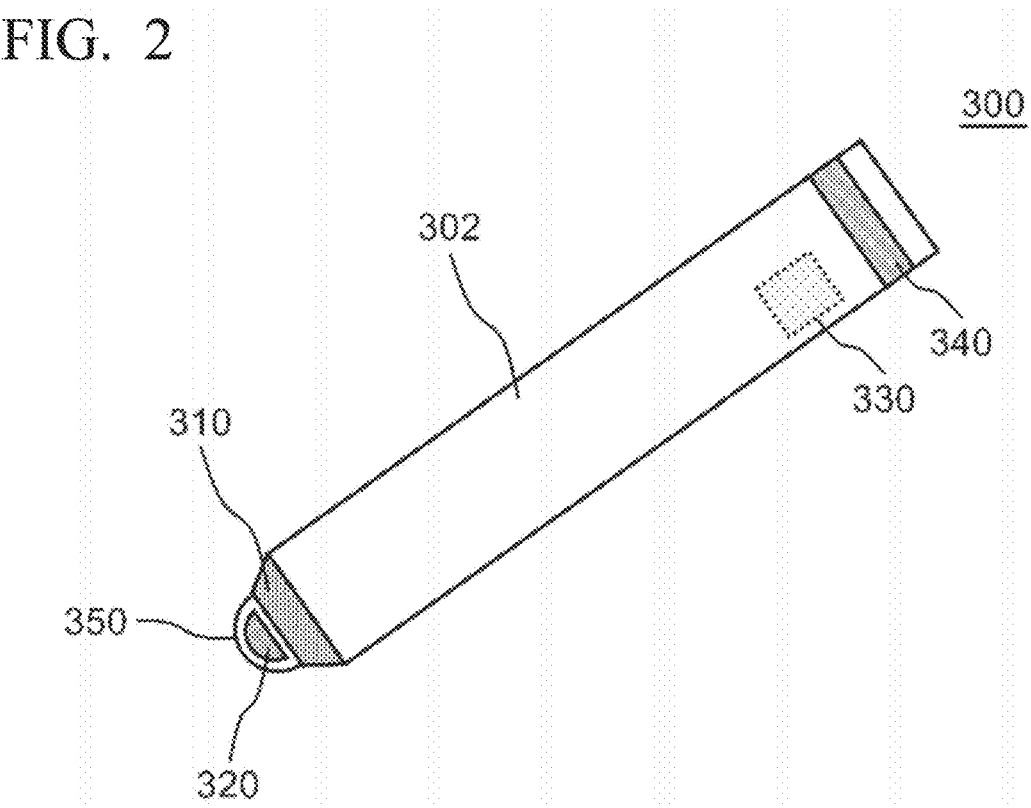
FIG. 2 is a diagram illustrating an example of an electronic writing instrument which is used in the display system shown in FIG. 1.

FIG. 1 is a diagram illustrating a display system 30 according to Embodiment 1. FIG. 2 is a diagram illustrating an example of an electronic writing instrument 300 which is used in the display system 30 shown in FIG. 1.

The display system 30 includes an information processing device 10, a display device 20, at least one electronic writing instrument 300, and a sensor device 400. The display device 20 displays a display image 200.

An outline of the information processing device 10 will be described with reference to FIG. 1. The information processing device 10 includes an acquisition unit 110 and an association unit 120. The acquisition unit 110 acquires first information and second information. The first information includes a trajectory traced by the electronic writing instrument 300 in the writing of an object O on the display image 200. The first information is generated by processing a detection result which is output from a first sensor 410. The first sensor 410 is provided outside the electronic writing instrument 300. The second information includes a trajectory traced by the electronic writing instrument 300 in the writing of the object O on the display image 200. The second information is generated by processing a detection result which is output from a second sensor 320. The second sensor 320 is provided in the electronic writing instrument 300 to detect the movement of the electronic writing instrument 300. The association unit 120 associates the object O with the electronic writing instrument 300 using the first information and the second information.

According to the present embodiment, it is possible to specify which object O is written with which electronic writing instrument 300 with a high degree of certainty. Specifically, in the present embodiment, the association unit 120 associates the object O with the electronic writing instrument 300 using both a trajectory (the first information) detected by processing a detection result which is output from a sensor (the first sensor 410) provided outside the electronic writing instrument 300 and a trajectory (the second information) detected by processing a detection result which is output from a sensor (the second sensor 320) provided in the electronic writing instrument 300. Therefore, it is possible to specify a trajectory that cannot be specified using one of these two trajectories alone (for example, a trajectory which will be described later with reference to FIG. 3). Thus, it is possible to specify which object O is written with which electronic writing instrument 300 with a high degree of certainty.

Further, according to the present embodiment, the following display method is realized. That is, the second sensor 320 detects a trajectory of the electronic writing instrument 300 when the object O is written on the display image 200 with the electronic writing instrument 300. Next, the object O associated with the electronic writing instrument 300 can be displayed, using information of this trajectory, on the display image 200 in a mode according to the electronic writing instrument 300.

In the present embodiment, the first sensor 410 can detect light emitted from a light-emitting portion 310 provided in the electronic writing instrument 300. In this case, the first information (trajectory) is generated by processing a detection result of the light emitted from the light-emitting portion 310.

The first sensor 410 may detect the contact or proximity of the electronic writing instrument 300 with or to the display image 200 instead of light. In this case, the first information (trajectory) is generated by processing a detection result for a position where the electronic writing instrument 300 is in contact with or in proximity to the display image 200. In this example, the display image 200 can be, for example, a touch screen, and the first sensor 410 can be, for example, a contact sensor, a pressure sensor, or a proximity sensor provided on the touch screen.

The object O is displayed superimposed on the display image 200 on the basis of a trajectory traced by the electronic writing instrument 300. For example, the trajectory traced by the electronic writing instrument 300 can be specified using a detection result of the first sensor 410.

The acquisition unit 110 may acquire the first information through one interface (for example, in one of wired and wireless manners), and may acquire the second information through the other interface different from the one interface (for example, in the other of wired and wireless manners).

Alternatively, the acquisition unit 110 may acquire both the first information and the second information through a common interface (for example, in one of wired and wireless manners).

The details of the display system 30 will be described with reference to FIGS. 1 and 2.

In an example, the display device 20 is a projector. In this example, the display image 200 may be an image projected on a projection surface (for example, a screen or a wall) by a projector (the display device 20). In another example, the display device 20 is a display. In this example, the display image 200 may be an image displayed on a display surface by a display (the display device 20). The display image 200 is realized by, for example, an electronic blackboard.

Each of a plurality of objects O is written on the display image 200 with one of a plurality of electronic writing instruments 300. In the example shown in FIG. 1, an object O1, an object O2, and an object O3 are written with an electronic writing instrument 300*a*, an electronic writing instrument 300*b*, and an electronic writing instrument 300*c*, respectively.

The electronic writing instrument 300 includes a supporting body 302, the light-emitting portion 310, the second sensor 320, a storage unit 330, a communication unit 340, and a pressing switch 350.

The supporting body 302 has a leading end and a rear end, and extends in one direction from the leading end to the rear end. The light-emitting portion 310, the second sensor 320, the storage unit 330, the communication unit 340, and the pressing switch 350 are attached to the supporting body 302, and are integrated with each other through the supporting body 302.

The light-emitting portion 310 emits light in the writing of the object O on the display image 200. The light emitted from the light-emitting portion 310 can be, for example, infrared rays or visible light. In a case where the light-emitting portion 310 emits infrared rays, the light emitted from the light-emitting portion 310 can be prevented from being recognized by human vision. When the electronic writing instrument 300 moves in the writing of the object O, the light emitted from the light-emitting portion 310 also moves to form a trajectory of light. The light-emitting portion 310 is located on the leading-end side of the supporting body 302. Therefore, the light-emitting portion 310 can be brought in proximity to the object O. Therefore, the trajectory of the light emitted from the light-emitting portion 310 can be made to substantially follow the shape of the object O.

The second sensor 320 detects the movement of the electronic writing instrument 300 (the supporting body 302) in the writing of the object O on the display image 200. The second sensor 320 can detect the movement of the electronic writing instrument 300, for example, by detecting the acceleration or inclination of the electronic writing instrument 300. The second sensor 320 includes, for example, at least one selected from the group consisting of an acceleration sensor and a gyro sensor. The second sensor 320 is located on the leading-end side of the light-emitting portion 310. Therefore, the second sensor 320 can be brought in proximity to the object O. Therefore, the trajectory of the movement detected by the second sensor 320 can be made to substantially follow the shape of the object O.

The second information is generated by processing a detection result which is output from the second sensor 320. A place where the processing of the detection result of the second sensor 320 is executed is not particularly limited. For example, the processing of the detection result of the second sensor 320 may be executed inside the information processing device 10 (for example, in the acquisition unit 110), may be executed inside the electronic writing instrument 300, or may be executed outside the information processing device 10 and the electronic writing instrument 300 (for example, in an external network).

The storage unit 330 stores data (the second information) detected by processing the detection result of the second sensor 320. Identification information of the electronic writing instrument 300 (for example, the line color or line shape of the object O written with the electronic writing instrument 300) may be further stored in advance.

The communication unit 340 transmits and receives a signal to and from an external device (for example, the information processing device 10 and the sensor device 400) of the electronic writing instrument 300. The communication unit 340 can transmit the second information stored in the storage unit 330 to the information processing device 10.

The pressing switch 350 is configured to be capable of being pressed against the display image 200. The pressing switch 350 includes, for example, at least one selected from the group consisting of a pressure sensor and a contact sensor. While the pressing switch 350 is pushed by pressing the pressing switch 350 against the display image 200, the light-emitting portion 310 may emit light, the second sensor 320 may detect the movement of the electronic writing instrument 300, and the storage unit 330 may store the data detected by the second sensor 320. In this manner, the second sensor 320 can detect the trajectory of the electronic writing instrument 300 after the electronic writing instrument 300 is pressed against the display image 200 until the electronic writing instrument 300 is moved away from the display image 200. The second sensor 320 does not have to detect the trajectory of the electronic writing instrument 300 while the electronic writing instrument 300 is not pressed against the display image 200 (while the pressing switch 350 is not pushed).

The sensor device 400 includes the first sensor 410, a storage unit 420, and a communication unit 430.

The first sensor 410 detects the light emitted from the light-emitting portion 310 of the electronic writing instrument 300. Thereby, the first sensor 410 can detect the trajectory (the first information) of the light emitted from the light-emitting portion 310 of the electronic writing instrument 300.

The first sensor 410 includes, for example, an image capturing unit and an image processing unit. In this example, the light (the first information) emitted from the light-emitting portion 310 of the electronic writing instrument 300 is generated by processing an image generated by the first sensor 410. The image generated by this image capturing unit is, for example, a moving image, and has a plurality of frame images. The first information is generated by the image processing unit processing these frame images. The image processing unit is realized by, for example, installing software for image processing in a computer device having a CPU and a memory. The image processing unit may be a microcomputer. This image processing unit may be provided integrally with the image capturing unit (for example, in the same housing), or may be provided separately from the image capturing unit. The image processing unit may be included in the information processing device 10.

The first information is generated by processing a detection result which is output from the first sensor 410. A place where the processing of the detection result of the first sensor 410 is executed is not particularly limited. For example, the processing of the detection result of the first sensor 410 may be executed inside the information processing device 10 (for example, in the acquisition unit 110), or may be executed outside the information processing device 10 (for example, in an external network).

The storage unit 420 stores data (the first information) detected by the first sensor 410.

The communication unit 430 transmits and receives a signal to and from an external device (for example, the information processing device 10 and the electronic writing instrument 300) of the sensor device 400. The communication unit 430 can transmit the first information stored in the storage unit 420 to the information processing device 10.

The first sensor 410 may detect the trajectory of the electronic writing instrument 300 after the electronic writing instrument 300 is pressed against the display image 200 until the electronic writing instrument 300 is moved away from the display image 200. For example, in a case where the pressing switch 350 of the electronic writing instrument 300 is pressed against the display image 200 and the pressing switch 350 is pushed, the communication unit 340 of the electronic writing instrument 300 transmits a signal to the communication unit 430. In this case, while the pressing switch 350 is pushed, the first sensor 410 may detect the light of the light-emitting portion 310 of the electronic writing instrument 300, and the storage unit 420 may store the data detected by the first sensor 410. The first sensor 410 does not have to detect the trajectory of the electronic writing instrument 300 while the electronic writing instrument 300 is not pressed against the display image 200.

The acquisition unit 110 acquires the first information transmitted from the sensor device 400 (the first sensor 410), and acquires the second information transmitted from the electronic writing instrument 300 (the second sensor 320). The first information may be transmitted directly from the sensor device 400 (the first sensor 410) to the acquisition unit 110, or may be transmitted to the acquisition unit 110 through a device different from the sensor device 400 (the first sensor 410). The second information may be transmitted directly from the electronic writing instrument 300 (the second sensor 320) to the acquisition unit 110, or may be transmitted to the acquisition unit 110 through a device different from the electronic writing instrument 300 (the second sensor 320).

FIG. 3 is a diagram illustrating an example of an operation of the display system 30.

In the upper part of FIG. 3, the electronic writing instrument 300a, the electronic writing instrument 300b, and the electronic writing instrument 300c trace a trajectory L1, a trajectory L2, and a trajectory L3 shown in the lower part of FIG. 3, respectively. Particularly, in the upper part of FIG. 3, the trajectory L1, the trajectory L2, and the trajectory L3 intersect each other in a region a shown in the upper part of FIG. 3. If the electronic writing instrument 300a, the electronic writing instrument 300b, and the electronic writing instrument 300c reach the region a at substantially the same timing, light from the light-emitting portion 310 of each electronic writing instrument 300 is emitted from substantially the same position in the region a. In this case, when only the light emitted from each electronic writing instrument 300 is detected (in other words, when only the first information out of the first information and the second information is detected), it may be difficult to identify which trajectory each electronic writing instrument 300 has traced after passing through the region a.

In response to such a hindrance, in the present embodiment, not only a trajectory (the first information) detected from the light emitted from the electronic writing instrument 300 but also a trajectory (the second information) detected from the movement of the electronic writing instrument 300 is used. According to the second information, it is possible to easily identify even trajectories in a case where the electronic writing instrument 300a, the electronic writing instrument 300b, and the electronic writing instrument 300c reach the region a at substantially the same timing. Therefore, according to the present embodiment, it is possible to identify even a trajectory that is difficult to identify by the trajectory (the first information) alone specified by detecting the light emitted from the electronic writing instrument 300.

Figure 4:
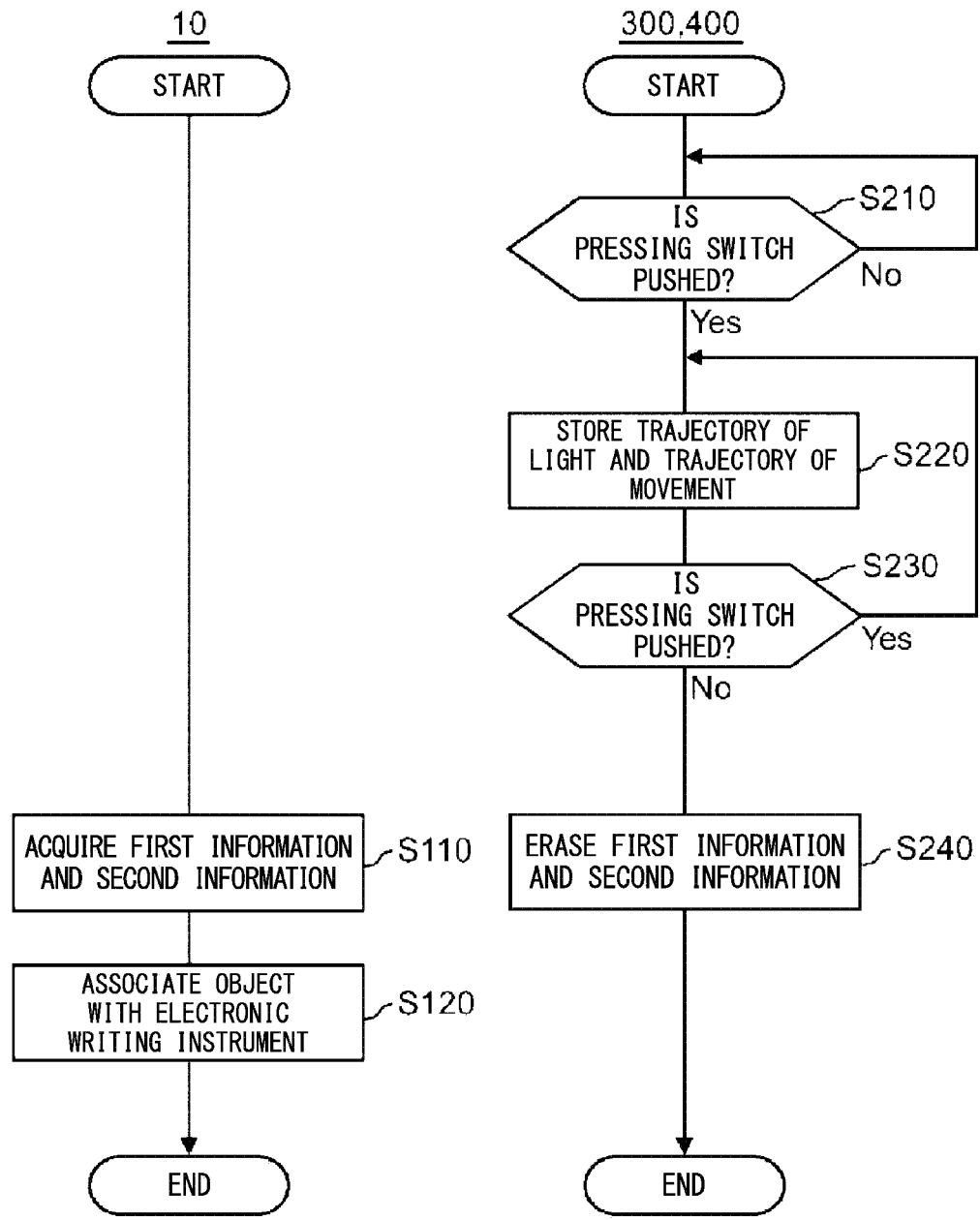
FIG. 4 is a flowchart illustrating a first example of each operation of an information processing device, the electronic writing instrument, and a sensor device which are shown in FIG. 1.

FIG. 4 is a flowchart illustrating a first example of each operation of the information processing device 10, the electronic writing instrument 300, and the sensor device 400 which are shown in FIG. 1.

First, the electronic writing instrument 300 detects whether the pressing switch 350 is pushed until the pressing switch 350 is pressed against the display image 200 and the pressing switch 350 is pushed (step S210: No) (step S210). When the electronic writing instrument 300 detects that the pressing switch 350 is pushed (step S210: Yes), while the pressing switch 350 is pushed (while the electronic writing instrument 300 is pressed against the display image 200) (step S230: Yes), the sensor device 400 causes the first sensor 410 to detect the trajectory of the light emitted from the light-emitting portion 310 of the electronic writing instrument 300 and stores the detected trajectory in the storage unit 420, and the electronic writing instrument 300 causes the second sensor 320 to detect the trajectory of the movement of the electronic writing instrument 300 and stores the detected trajectory in the storage unit 330 (step S220). The trajectory stored in the storage unit 420 is the first information, and the trajectory stored in the storage unit 330 is the second information.

The acquisition unit 110 of the information processing device 10 acquires the first information and the second information (step S110). The acquisition unit 110 may acquires the first information and the second information at different timings, or may acquire the first information and the second information at the same timing. For example, the acquisition unit 110 may sequentially acquire the first information generated sequentially from the detection result of the first sensor 410 between step S210 and step S230, or may acquire the first information generated from the detection result of the first sensor 410 after the end of step S230. Similarly, the acquisition unit 110 may sequentially acquire the second information generated sequentially from the detection result of the second sensor 320 between step S210 and step S230, or may acquire the second information generated from the detection result of the second sensor 320 after the end of step S230. Next, the association unit 120 of the information processing device 10 associates the object O with the electronic writing instrument 300 using the first information and the second information (step S120).

On the other hand, in a case where the electronic writing instrument 300 is moved away from the display image 200 (step S230: No), the sensor device 400 erases the trajectory (the first information) stored in step 220 from the storage unit 420, and the electronic writing instrument 300 erases the trajectory (the second information) stored in step S220 from the storage unit 330 (step S240). Therefore, it is possible to reduce the confusion between the first information detected at one timing and the first information detected at the other timing. Similarly, it is possible to reduce the confusion between the second information detected at one timing and the second information detected at the other timing.

In the example shown in FIG. 4, step S220 is executed on the basis of whether the pressing switch 350 of the electronic writing instrument 300 is pushed (steps S210 and S230), but step S220 may be executed on the basis of whether the electronic writing instrument 300 is in contact with or in proximity to the display image 200 using a method other than the pressing switch 350.

Figure 5:
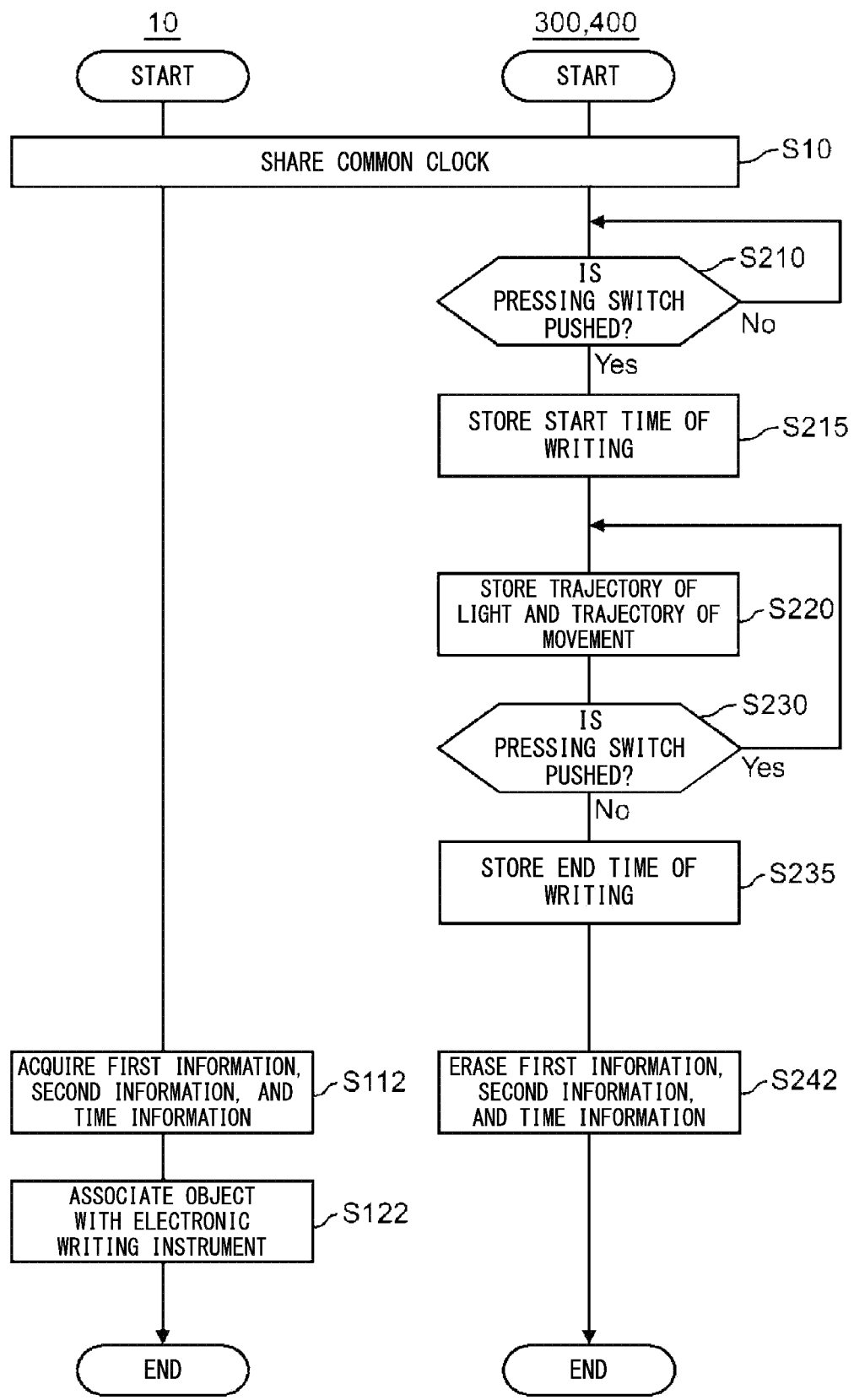
FIG. 5 is a flowchart illustrating a second example of each operation of the information processing device, the electronic writing instrument, and the sensor device which are shown in FIG. 1.

FIG. 5 is a flowchart illustrating a second example of each operation of the information processing device 10, the electronic writing instrument 300, and the sensor device 400 which are shown in FIG. 1. The example shown in FIG. 5 is the same as the example shown in FIG. 4 except for the following points.

First, a common clock is shared by the information processing device 10 and the electronic writing instrument 300 (step S10). In a case where there are a plurality of electronic writing instruments 300, in step S10, a common clock with the information processing device 10 is shared by the plurality of electronic writing instruments 300. Next, in the same manner as in the example shown in FIG. 4, step S210 is executed. After step S210, the electronic writing instrument 300 stores a start time of writing of the object O (a time at which the pressing of the pressing switch 350 of the electronic writing instrument 300 is started) in the storage unit 330 (step S215). In step S215, the start time of writing of the object O is obtained by referring to the above-described clock. Next, in the same manner as in the example shown in FIG. 4, steps S220 and S230 are executed. In a case where the electronic writing instrument 300 is moved away from the display image 200 (step S230: No), the electronic writing instrument 300 stores an end time of writing of the object O (a time at which the pressing of the pressing switch 350 of the electronic writing instrument 300 is ended) in the storage unit 330 (step S235). In step S235, the end time of writing of the object O is obtained by referring to the above-described clock. In this manner, time information including the start time and end time of writing of the object O performed by the electronic writing instrument 300 is generated.

The acquisition unit 110 of the information processing device 10 acquires the first information, the second information, and the time information (step S112). The acquisition unit 110 may acquire the first information, the second information, and the time information at different timings, or may acquire the first information, the second information, and the time information at the same timing. For example, the acquisition unit 110 can acquire the time information transmitted after step S235 from the communication unit 340 of the electronic writing instrument 300. Next, the association unit 120 of the information processing device 10 associates the object O with the electronic writing instrument 300 using the first information, the second information, and the time information (step S122). On the other hand, the sensor device 400 erases the trajectory (the first information) stored in step 220 from the storage unit 420, and the electronic writing instrument 300 erases the trajectory (the second information) stored in step S220 and the time (the time information) stored in steps S215 and S235 from the storage unit 330 (step S242).

According to the example shown in FIG. 5, it is possible to specify which object O is written with which electronic writing instrument 300 using the start time of writing of the object O and the end time of writing of the object O. In a case where the start time of writing of the object O and the end time of writing of the object O differ depending on the electronic writing instrument 300, it is possible to specify which object O is written with which electronic writing instrument 300 with a high degree of certainty.

Second Embodiment

Figure 6:
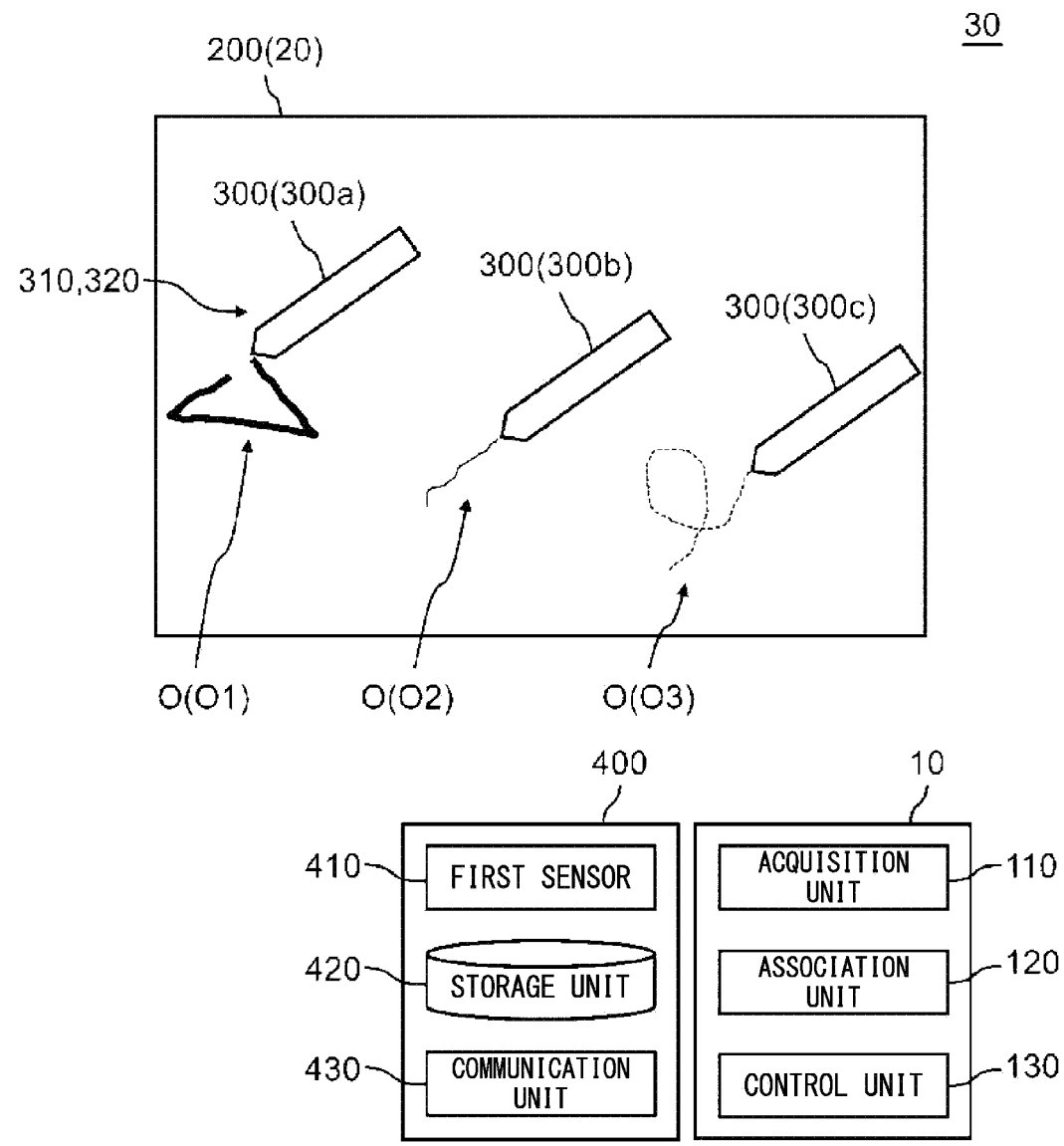
FIG. 6 is a diagram illustrating a display system according to Embodiment 2.

FIG. 6 is a diagram illustrating a display system 30 according to Embodiment 2. The display system 30 according to Embodiment 2 is the same as the display system 30 according to Embodiment 1 except for the following points.

The information processing device 10 further includes a control unit 130. In a case where a plurality of electronic writing instruments 300 are used, the control unit 130 displays the object O on the display image 200 in a different mode for each of the plurality of electronic writing instruments 300.

According to the present embodiment, it becomes easy to display the object O on the display image 200 in a different mode for the electronic writing instrument 300. Specifically, in the present embodiment, as described in Embodiment 1, the association unit 120 acquires a correspondence relation between the object O and the electronic writing instrument 300. Using this correspondence relation, the control unit 130 can display the object O on the display image 200 in a different mode for the electronic writing instrument 300. Therefore, it becomes easy to display the object O on the display image 200 in a different mode for the electronic writing instrument 300.

The mode of the object O may include, for example, at least one of the line color and the line shape of the object O. The line shape of the object O includes, for example, at least one of a line weight and a line style (for example, a solid line, a broken line, a dashed-dotted line, or a double line). In the example shown in FIG. 6, the line of the object O1 is a thick line, the line of the object O2 is a thin line, and the line of the object O3 is a broken line.

The mode of the object O may differ depending on, for example, identification information provided to the electronic writing instrument 300. In this example, the electronic writing instrument 300 is provided with identification information that differs depending on the electronic writing instrument 300. The identification information may be stored in, for example, the storage unit 330 (FIG. 2). The identification information may include, for example, the mode of the object O (for example, the line color or line shape of the object O) written with the electronic writing instrument 300. The association unit 120 associates the object O with the electronic writing instrument 300 using the first information, the second information, and the identification information. The control unit 130 can control the mode of the object O on the basis of the association result of the association unit 120.

Figure 7:
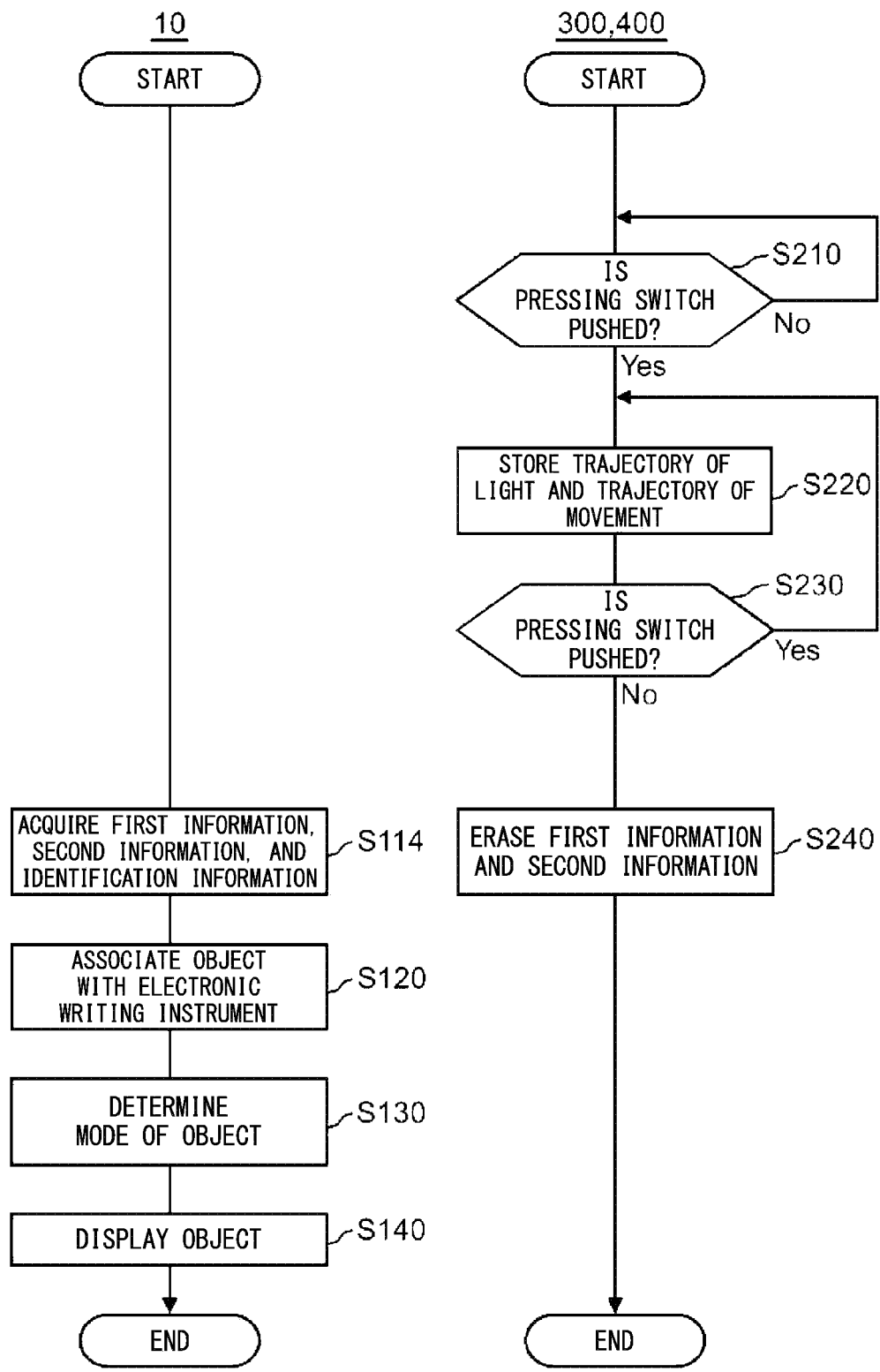
FIG. 7 is a flowchart illustrating an example of each operation of an information processing device, an electronic writing instrument, and a sensor device which are shown in FIG. 6.

FIG. 7 is a flowchart illustrating an example of each operation of the information processing device 10, the electronic writing instrument 300, and the sensor device 400 which are shown in FIG. 6. The example shown in FIG. 7 is the same as the example shown in FIG. 4 except for the following points.

First, in the same manner as in the example shown in FIG. 4, steps S210, S220, and S230 are executed.

The acquisition unit 110 of the information processing device 10 acquires the first information, the second information, and the identification information (step S114). The acquisition unit 110 may acquire the first information, the second information, and the identification information at different timings, or may acquire the first information, the second information, and the identification information at the same timing. Particularly, the acquisition unit 110 may acquire the second information and identification information at the same timing. Next, the association unit 120 of the information processing device 10 associates the object O with the electronic writing instrument 300 using the first information, the second information, and the identification information (step S120).

Next, the control unit 130 of the information processing device 10 determines the mode of the object O in accordance with the association result of step S120 (step S130). Next, the control unit 130 of the information processing device 10 displays the object O on the display image 200 in the mode determined in step S130 (step S140).

Third Embodiment

Figure 8:
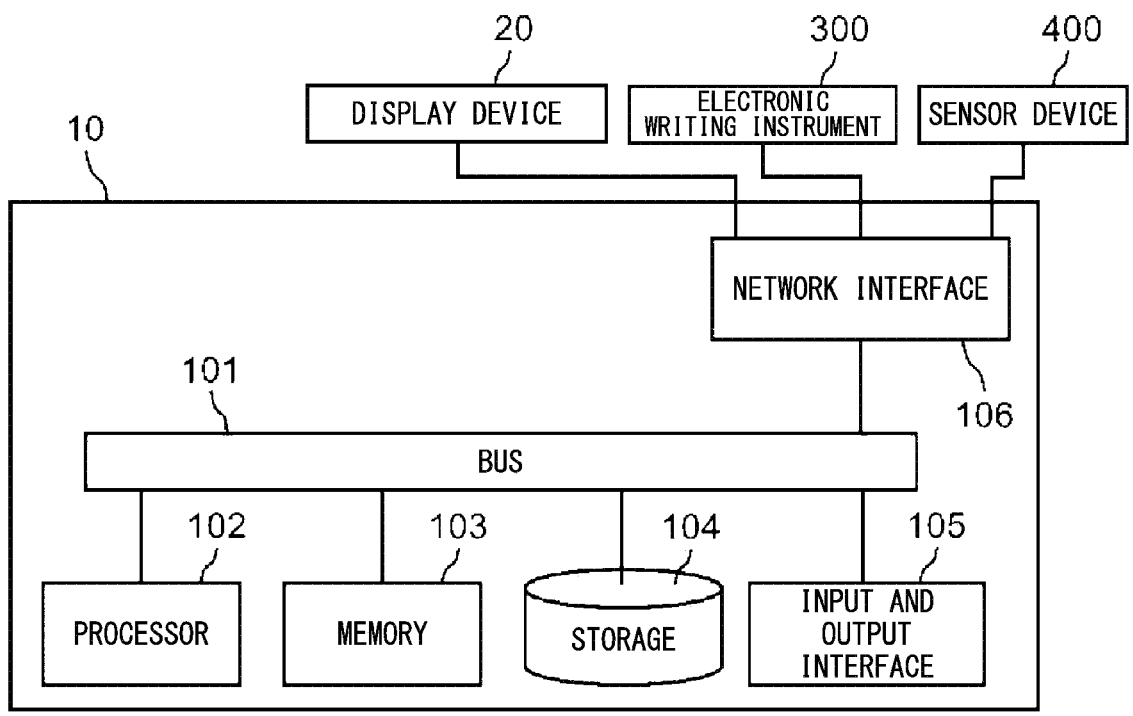
FIG. 8 is a diagram illustrating an example of a hardware configuration of an information processing device according to Embodiment 3.

FIG. 8 is a diagram illustrating an example pf a hardware configuration of an information processing device 10 according to Embodiment 3.

The main configuration of the information processing device 10 is realized using an integrated circuit. This integrated circuit includes a bus 101, a processor 102, a memory 103, a storage device 104, an input and output interface 105, and a network interface 106.

The bus 101 is a data transmission channel in order for the processor 102, the memory 103, the storage device 104, the input and output interface 105, and the network interface 106 to mutually transmit and receive data. However, a method of connecting the processor 102 and the like to each other is not limited to a bus connection.

The processor 102 is an arithmetic processing unit which is realized using a microprocessor or the like.

The memory 103 is a memory which is realized using a random access memory (RAM) or the like.

The storage device 104 is a storage device which is realized using a read only memory (ROM), a flash memory, or the like.

The input and output interface 105 is an interface for connecting the information processing device 10 to a peripheral device.

The network interface 106 is an interface for connecting the information processing device 10 to a communication network. A method in which the network interface 106 is connected to a communication network may be a wireless connection, or may be a wired connection. The information processing device 10 is connected to the display device 20, the electronic writing instrument 300 (for example, the communication unit 340 shown in FIG. 2), and the sensor device 400 (for example, the communication unit 430 shown in FIG. 1) through the network interface 106.

The storage device 104 stores a program module for realizing each functional element of the information processing device 10. The processor 102 reads out this program module to the memory 103 and executes the read-out program module, to thereby realize each function of the information processing device 10.

Meanwhile, the hardware configuration of the integrated circuit described above is not limited to the configuration shown in FIG. 8. For example, the program module may be stored in the memory 103. In this case, the integrated circuit may not include the storage device 104.

Hereinbefore, although the embodiments of the present invention have been described with reference to the accompanying drawings, these embodiments are merely illustrative of the present invention, and various configurations other than those stated above can be adopted.

Hereinafter, examples of embodying the invention will be described.

In some embodiments, an information processing method may include, but is not limited to, acquiring first information, generated by processing a detection result which is output from a first sensor provided outside an electronic writing instrument, which includes a trajectory traced by the electronic writing instrument in writing of an object on a display image and second information, generated by processing a detection result which is output from a second sensor provided in the electronic writing instrument to detect a movement of the electronic writing instrument, which includes a trajectory traced by the electronic writing instrument in writing of the object on the display image; and associating the object with the electronic writing instrument using the first information and the second information.

In some cases, the electronic writing instrument is provided with identification information, and the method further includes associating the object with the electronic writing instrument using the identification information.

In some cases, the first sensor detects light generated from a light-emitting portion provided in the electronic writing instrument.

In some cases, the first sensor detects contact or proximity of the electronic writing instrument with or to the display image.

In some cases, the method may further include, but is not limited to: acquiring time information including a start time and an end time of writing of the object performed by the electronic writing instrument; and associating the object with the electronic writing instrument using the time information.

In some cases, the first information includes the trajectory after the electronic writing instrument is pressed against the display image until the electronic writing instrument is moved away from the display image, and the second information includes the trajectory after the electronic writing instrument is pressed against the display image until the electronic writing instrument is moved away from the display image.

In some cases, the first information and the second information are not detected while the electronic writing instrument is not pressed against the display image.

In some cases, the method may further include, but is not limited to: in a case where a plurality of electronic writing instruments are used, displaying the object on the display image in a different mode for each of the plurality of electronic writing instruments.

In some cases, the mode of the object includes at least one of a line color and a line shape of the object.

In some cases, the light emitted from the light-emitting portion is detected from an image including the display image on which the object is written.

In some cases, the display image is an image projected on a projection surface by a projector or an image displayed on a display surface by a display.

In some cases, the object is displayed superimposed on the display image on the basis of the trajectory traced by the electronic writing instrument.

In other embodiments, a non-transitory computer readable storage medium that stores computer-executable instructions that when executed by the computer, cause the computer to perform: acquiring first information, generated by processing a detection result which is output from a first sensor provided outside an electronic writing instrument, which includes a trajectory traced by the electronic writing instrument in writing of an object on a display image and second information, generated by processing a detection result which is output from a second sensor provided in the electronic writing instrument to detect a movement of the electronic writing instrument, which includes a trajectory traced by the electronic writing instrument in writing of the object on the display image; and associating the object with the electronic writing instrument using the first information and the second information.

In some cases, the electronic writing instrument is provided with identification information, and the computer further associates the object with the electronic writing instrument using the identification information.

In some cases, the first sensor detects light generated from a light-emitting portion provided in the electronic writing instrument.

In some cases, the first sensor detects contact or proximity of the electronic writing instrument with or to the display image.

In some cases, the computer further acquires time information including a start time and an end time of writing of the object performed by the electronic writing instrument, and the computer further associates the object with the electronic writing instrument using the time information.

In some cases, the first information includes the trajectory after the electronic writing instrument is pressed against the display image until the electronic writing instrument is moved away from the display image, and the second information includes the trajectory after the electronic writing instrument is pressed against the display image until the electronic writing instrument is moved away from the display image.

In some cases, the first information and the second information are not detected while the electronic writing instrument is not pressed against the display image.

In some cases, the computer-executable instructions, when executed by the computer, further cause the computer to perform: in a case where a plurality of electronic writing instruments are used, have a function of displaying the object on the display image in a different mode for each of the plurality of electronic writing instruments.

In some cases, the mode of the object includes at least one of a line color and a line shape of the object.

In some cases, the light emitted from the light-emitting portion is detected from an image including the display image on which the object is written.

In some cases, the display image is an image projected on a projection surface by a projector or an image displayed on a display surface by a display.

In some cases, the object is displayed superimposed on the display image on the basis of the trajectory traced by the electronic writing instrument.

In some cases, the computer acquires the first information through one interface, and acquires the second information through the other interface different from the one interface.

In other embodiments, a display system may include, but us not limited to, a display device; an electronic writing instrument which is used for writing of an object on a display image displayed by the display device; and an information processing device. The information processing device may include, but is not limited to, an acquisition unit that acquires first information, generated by processing a detection result which is output from a first sensor provided outside the electronic writing instrument, which includes a trajectory traced by the electronic writing instrument in writing of the object on the display image and second information, generated by processing a detection result which is output from a second sensor provided in the electronic writing instrument to detect a movement of the electronic writing instrument, which includes a trajectory traced by the electronic writing instrument in writing of the object on the display image, and an association unit that associates the object with the electronic writing instrument using the first information and the second information.

In some cases, the electronic writing instrument is provided with identification information, and In some cases, the association unit further associates the object with the electronic writing instrument using the identification information.

In some cases, the first sensor detects light generated from a light-emitting portion provided in the electronic writing instrument.

In some cases, the first sensor detects contact or proximity of the electronic writing instrument with or to the display image.

In some cases, the acquisition unit further acquires time information including a start time and an end time of writing of the object performed by the electronic writing instrument, and the association unit further associates the object with the electronic writing instrument using the time information.

In some cases, the first information includes the trajectory after the electronic writing instrument is pressed against the display image until the electronic writing instrument is moved away from the display image, and the second information includes the trajectory after the electronic writing instrument is pressed against the display image until the electronic writing instrument is moved away from the display image.

In some cases, the first information and the second information are not detected while the electronic writing instrument is not pressed against the display image.

In some cases, the information processing device further includes a control unit that, in a case where a plurality of electronic writing instruments are used, displays the object on the display image in a different mode for each of the plurality of electronic writing instruments.

In some cases, the mode of the object includes at least one of a line color and a line shape of the object.

In some cases, the light emitted from the light-emitting portion is detected from an image including the display image on which the object is written.

In some cases, the display image is an image projected on a projection surface by a projector or an image displayed on a display surface by a display.

In some cases, the object is displayed superimposed on the display image on the basis of the trajectory traced by the electronic writing instrument.

In some cases, the acquisition unit acquires the first information through one interface, and acquires the second information through the other interface different from the one interface.

What is claimed is:

1. An information processing device comprising:
   an electronic writing instrument having identification information;
   one or more hardware processors; and
   one or more memories that store processor-executable instructions that are executable by the one or more hardware processors to cause the one or more hardware processors to perform;
   acquiring first information, generated by processing a detection result which is output from a first sensor provided outside the electronic writing instrument, which includes a trajectory traced by the electronic writing instrument in writing of an object on a display image;

acquiring second information, generated by processing a detection result which is output from a second sensor provided in the electronic writing instrument to detect a movement of the electronic writing instrument, which includes a trajectory traced by the electronic writing instrument in writing of the object on the display image; and associating the object with the electronic writing instrument using the first information, the second information and further the identification information of the electronic writing instrument.

2. The information processing device according to claim 1, wherein the first sensor detects light generated from a light-emitting portion provided in the electronic writing instrument.

3. The information processing device according to claim 1, wherein the first sensor detects contact or proximity of the electronic writing instrument with or to the display image.

4. The information processing device according to claim 1, wherein the one or more hardware processors further perform acquiring time information including a start time and an end time of writing of the object performed by the electronic writing instrument, and the one or more hardware processors further perform associating the object with the electronic writing instrument using the time information.

5. The information processing device according to claim 1, wherein the first information includes the trajectory after the electronic writing instrument is pressed against the display image until the electronic writing instrument is moved away from the display image, and the second information includes the trajectory after the electronic writing instrument is pressed against the display image until the electronic writing instrument is moved away from the display image.

6. The information processing device according to claim 5, wherein the first information and the second information are not detected while the electronic writing instrument is not pressed against the display image.

7. The information processing device according to claim 1, further comprising a control unit that, in a case where a plurality of electronic writing instruments are used, displays the object on the display image in a different mode for each of the plurality of electronic writing instruments.

8. The information processing device according to claim 7, wherein the mode of the object includes at least one of a line color and a line shape of the object.

9. The information processing device according to claim 1, wherein the light emitted from the light-emitting portion is detected from an image including the display image on which the object is written.

10. The information processing device according to claim 1, wherein the display image is an image projected on a projection surface by a projector or an image displayed on a display surface by a display.

11. The information processing device according to claim 1, wherein the object is displayed superimposed on the display image on the basis of the trajectory traced by the electronic writing instrument.

12. The information processing device according to claim 1, wherein the one or more hardware processors perform acquiring the first information through one interface, and acquiring the second information through an other interface different from the one interface.

13. A display method comprising:
detecting, when an electronic writing instrument having an identification information writes an object on a display screen, a first trajectory of the electronic writing instrument using a first sensor provided outside the electronic writing instrument;

detecting, when the electronic writing instrument writes the object on the display screen, a second trajectory of the electronic writing instrument using a second sensor provided in the electronic writing instrument;

associating the object with the electronic writing instrument using the first and second trajectories and further using the identification information of the electronic writing, instrument; and displaying the object associated with the electronic writing instrument, using information of the first and second trajectories, on the display screen in a mode according to the electronic writing instrument.

14. The information processing device according to claim 1, wherein the second sensor is located on a leading-end side of a light-emitting portion of the electronic writing instrument.

15. An information processing device comprising:
one or more hardware processors; and
one or more memories that store processor-executable instructions that are executable by the one or more hardware processors to cause the one or more hardware processors to perform:

acquiring first information, generated by processing a detection result which is output from a first sensor provided outside the electronic writing instrument, which includes a trajectory traced by the electronic writing instrument in writing of an object on a display image;

acquiring second information, generated by processing a detection result which is output from a second sensor provided in the electronic writing instrument to detect a movement of the electronic writing instrument, which includes a trajectory traced by the electronic writing instrument in writing of the object on the display image; and associating the object with the electronic writing instrument using the first information, wherein the first information includes the trajectory after the electronic writing instrument is pressed against the display image until the electronic writing instrument is moved away from the display image, and wherein the second information includes the trajectory after the electronic writing instrument is pressed against the display image until the electronic writing instrument is moved away from the display image.

* * * * *